United States Patent [19]

Hwang

[11] Patent Number: 5,377,844
[45] Date of Patent: Jan. 3, 1995

[54] SEPARATION OF NORMALLY HYDROPHOBIC PLASTIC MATERIALS BY FROTH FLOTATION

[75] Inventor: Jiann-Yang Hwang, Houghton, Mich.

[73] Assignee: Nimco Shredding Co., Newark, N.J.

[21] Appl. No.: 60,698

[22] Filed: May 10, 1993

Related U.S. Application Data

[63] Continuation of Ser. No. 740,046, Aug. 2, 1991, abandoned.

[51] Int. Cl.$^6$ .................. B03D 1/02; B03D 1/008; B03D 1/012
[52] U.S. Cl. ..................... 209/167; 241/19; 241/20; 241/24; 521/42.5; 521/44; 521/45; 521/46.5; 209/11
[58] Field of Search .............. 209/166, 167, 9, 11; 241/19, 20, 24, DIG. 38; 521/42.5, 44, 45, 46.5

[56] References Cited

U.S. PATENT DOCUMENTS

| | | | |
|---|---|---|---|
| 3,925,200 | 12/1975 | Izumi et al. | 209/9 |
| 3,926,790 | 12/1975 | Izumi | 209/9 |
| 3,926,791 | 12/1975 | Izumi et al. | 209/9 |
| 3,933,633 | 1/1976 | Saitoh | 209/166 |
| 3,941,688 | 3/1976 | Saitoh | 209/166 |
| 3,985,650 | 10/1976 | Saitoh et al. | 210/44 |
| 4,040,949 | 8/1977 | Saitoh | 209/166 |
| 4,046,677 | 9/1977 | Saitoh | 209/166 |
| 4,132,633 | 1/1979 | Saitoh et al. | 209/9 |
| 4,167,477 | 9/1979 | Valdez et al. | 209/166 |
| 4,617,111 | 10/1986 | Grimm | 209/167 |
| 5,120,768 | 6/1992 | Sisson . | |
| 5,252,614 | 10/1993 | Sisson . | |

FOREIGN PATENT DOCUMENTS 51-104403 9/1976 Japan .

OTHER PUBLICATIONS

Kirk Othmer Encylopedia of Chem. Technology 3rd Edition "*Emulsions*" pp. 900–918.
*Surface Chemistry* by Osipow Reinhold Pub. Co.-1962 pp. 309–315.

*Primary Examiner*—Thomas M. Lithgow
*Attorney, Agent, or Firm*—Michael, Best & Friedrich

[57] ABSTRACT

A targeted particulate, synthetic organic plastic material having normally hydrophobic surface characteristics is separated from a mixture of two or more of such plastic materials by conditioning the mixture of plastic materials in a flotation cell with a heteropolar surfactant which has a hydrophile-lipophile balance (HLB) value greater than 5 and which selectively depresses the targeted plastic material by making the surfaces thereof more hydrophilic without substantially affecting the surfaces of the other plastic material(s) and introducing gas bubbles into the resulting conditioned pulp such that the gas bubbles selectively adhere to the surfaces of the other plastic materials(s) and cause them to float. The targeted plastic material is recovered in the cell product and the other plastic material(s) is recovered in the float concentrate.

25 Claims, No Drawings

SEPARATION OF NORMALLY HYDROPHOBIC PLASTIC MATERIALS BY FROTH FLOTATION

This application is a continuation of application Ser. No. 07/740046 filed Aug. 2, 1991, now abandoned.

BACKGROUND OF THE INVENTION

This invention relates to separation of synthetic plastic materials and, more particularly, to processes for effecting such a separation by froth flotation.

Synthetic plastic materials, particularly long-chain, organic polymers and copolymers, are used for a variety of applications. It often is desirable to recover such plastic materials from refuse for recycling. When only one type of plastic material is present in the refuse, separation of the plastic material is relatively easy because the properties can be well controlled. However, when mixtures of two or more plastic materials are involved, separation of one type plastic material from the others is much more difficult because of a wide variation in the properties of the different plastic materials.

The approach most widely used for separating plastics from waste for recycling employs a heavy liquid or medium having a specific density. Plastic materials having a density higher than the medium sink and plastic materials having a lower density float. This approach is generally suitable for relatively pure polymers. However, it generally is ineffective for separations of waste containing a mixture of a number of different type plastic materials, coated plastic materials or plastic materials containing additives, for example, fillers, such as calcium carbonate, kaolin, silica, titanium oxide, colorants, antioxidants and the like. The densities of filled plastic materials can vary over a relatively wide range, depending on the type and concentration of the filler(s). Consequently, density separation generally cannot be used for such plastic materials.

It is known to use froth flotation to separate certain types of plastic materials. For example, Valdez et al. U.S. Pat. No. 4,167,477 discloses conditioning a mixture of polystyrene and two different polyamide plastics with sodium silicate and then subjecting the conditioned mixture to froth flotation to float polystyrene. The cell product from the first flotation is subjected to a second flotation, after being conditioned with a primary fatty amine, or salt thereof, to separate one polyamide plastic from the other. Sodium silicate acts as an inorganic wetting agent in the first flotation and the primary fatty amine acts as a cationic promoter to make one of the naturally unfloatable polyamide plastics, such as nylon, floatable. Use of a primary fatty amine as disclosed in this patent would be ineffective for separating a mixture of plastic materials normally having hydrophobic characteristics (i.e., are floatable), because none would remain in the cell product.

Izumi et al. U.S. Pat. 3,925,200, Izumi et al. U.S. Pat. No. 3,926,790 and Izumi et al. U.S. Pat. No. 3,926,791 disclose conditioning a mixture of plastic materials including polyvinyl chloride with an alkaline metal or alkaline earth metal salts of lignosulfonic acid or a hydrophilic organic colloid, such as tannic acid, quebarcho extract, gelatine, glue, saponin and the like, which act as a wetting agent to render the surfaces of polyvinyl chloride more hydrophilic and then subjecting the conditioned mixture to froth flotation to cause the polyvinyl chloride to separate with the cell product.

Saitoh et al. U.S. Pat. No. 3,985,650 discloses conditioning a mixture of a polyolefin, a polystyrene and ebonite with similar wetting agents to render the polystyrene and ebonite more hydrophilic and cause them to separate from a float fraction containing the polyolefin and then adding a frothing agent to the cell product from the first flotation to float polystyrene from ebonite.

Saitoh et al. U.S. Pat. No. 4,132,633 discloses conditioning a mixture of polyethylene, polypropylene and polystyrene with similar wetting agents to render the surfaces of the polystyrene more hydrophilic so that the polyethylene and/or polypropylene floats from the polystyrene and the polystyrene remains in the cell product.

The latter three flotation processes are limited with respect to the type of plastics which can be separated and do not provide an acceptable separation of some plastic materials.

SUMMARY OF THE INVENTION

An object of the invention is to provide a process for separating a preselected or targeted plastic material from a mixture of different plastic materials by froth flotation.

Another object of the invention is to provide such a process which is capable of being employed with a wide variety of different type plastic materials.

A further object of the invention is to provide such a method which can be employed with a mixture of plastic materials having normally hydrophobic surface characteristics.

Other objects, advantages and aspects of the invention will become apparent to those skilled in the art upon reviewing the following detailed description and the appended claims.

The invention provides a process for separating by froth flotation a targeted synthetic, organic plastic material having normally hydrophobic surface characteristics from a mixture of at least two different types of such plastic materials. A mixture of the plastic materials is conditioned in an aqueous medium containing a heteropolar surfactant having a hydrophile-lipophile balance (HLB) value of greater than 5 in an amount sufficient to make the surfaces of the targeted plastic material hydrophilic without substantially affecting the hydrophobicity of the surfaces of the other plastic materials. Thus, the surfactant acts as a depressant with respect to the targeted plastic material. Gas bubbles introduced into the conditioned pulp in a flotation cell selectively adhere to the plastic material(s) having a hydrophobic surface and cause them to float. The targeted plastic material is recovered in the cell product and the floated plastic material(s) is recovered in a float fraction. The targeted plastic material may be the desired product in which case it is recovered in the cell product or the undesired product in which case it is recovered in the froth.

The plastic material preferably has a contact angle of at least 30°, measured at 20° C., and a particle size less than about 0.5 inch. The surfactant preferably has a HLB value of at least 10 and, while a variety of cationic, anionic, nonionic or amphoteric surfactants can be used, ethoxylated surfactants containing polyoxyethylene (polyethylene oxide) in their structure are preferred.

In one embodiment, the mixture of plastic materials includes three or more plastic materials and at least two targeted plastic materials and sequential froth flotation separations are made to selectively separate the two targeted plastic materials. In the first separation, the mixture of plastic materials is conditioned with a surfactant for depressing a first one of the targeted plastic materials, the first targeted plastic material is recovered in the cell product and the second targeted material is recovered in the froth fraction. In tile second separation, the froth fraction from the first separation is conditioned with a surfactant for depressing the second targeted plastic material, the second targeted plastic material is recovered in the cell product and the floated plastic material is recovered in the froth fraction.

DESCRIPTION OF THE PREFERRED EMBODIMENTS

The invention can be used to separate a wide variety of synthetic, organic plastic materials having normally hydrophobic surface characteristics. It is particularly adaptable for long chain organic polymers and copolymers having a contact angle of at least 30°, preferably at least 50°, measured at a temperature 20° C.

Plastic materials capable of being separated in accordance of the invention include polyolefins, such as polyethylene, polypropylene, polyvinyl chloride, polystyrene, polyacrylics, acrylonitrile-butadiene-styrene, styrene-acrylonitrile, styrene butadiene, polybutylene, ethylene vinyl acetate, styrenic terpolymer and polymethylpentene; polyesters, such as polyethylene terephthalate, polycarbonate, polybutylene terephthalate and phenylene oxides; polyamides, such as nylon 6 and nylon 66; celluloses, such as cellulose acetate, cellulose acetate butyrate, cellulose and acetate propionate; polyurethanes, such as urethane elastomer; polyethers, such as polyaryl-ether, polyacetals (homo- and copolymers) and polyphylene and oxide; polysulfides, such as polysulfones and polyphenylene sulfide; and other synthetic plastic, such as phenolic resins, fluorocarbon polymers, and the like.

Table 1 below includes a representative list of specific plastic materials capable of being treated by the invention, including the specific gravity and contact angle (measured at 20° C.):

TABLE 1

Specific Gravity and Contact Angle of Various Plastics

| Plastic | Specific Gravity | Contact Angle |
|---|---|---|
| Polyethylene (low density) | 0.914–0.930 | 92 |
| Polyethylene (high density) | 0.945–0.960 | 87 |
| Polyethylene (medium density) | 0.930–0.945 | 90 |
| Polypropylene (copolymer) | 0.902 | 92 |
| Polypropylene (homopolymer) | 0.900 | 88 |
| Polypropylene (flame retardant) | 1.25 | 86 |
| Polypropylene (talc reinforced) | 1.00–1.24 | 92 |
| Polypropylene (calcium carbonate reinforced) | 1.00–1.24 | 88 |
| Polypropylene (mica reinforced) | 1.00–1.24 | 96 |
| Polyvinyl Chloride (flexible) | 1.30 | 87 |
| Polyvinyl Chloride (rigid) | 1.30 | 83 |
| Polystyrene (gen. purpose) | 1.05 | 89 |
| Polystyrene (medium impact) | 1.04 | 85 |
| Polystyrene (high impact) | 1.04 | 83 |
| Acrylic | 1.19 | 78 |
| Modified Acrylic | 1.19 | 68 |
| ABS (transparent) | 1.05 | 77 |
| ABS (medium impact) | 1.05 | 71 |
| ABS (high impact) | 1.05 | 79 |
| ABS (flame retardant) | 1.21 | 84 |
| ABS (nylon alloy) | 1.06 | 73 |
| Styrene Acrylonitrile (SAN) | 1.04 | 83 |
| Styrene Butadine | 1.01 | 91 |
| Ethylene Vinyl Acetate | 0.945 | 82 |

TABLE 1-continued

Specific Gravity and Contact Angle of Various Plastics

| Plastic | Specific Gravity | Contact Angle |
|---|---|---|
| (copolymer) | | |
| Polybutylene | 0.901 | 94 |
| Synthetic Elastomer (styrene block copolymer) | 1.01 | 91 |
| Styrenic Terpolymer | 1.02 | 72 |
| Polymethylpentene | 0.830 | 96 |
| Polycarbonate | 1.20 | 80 |
| Phenylene Oxide | 1.10 | 88 |
| Thermoplastic Polyester (PBT) | 1.30 | 75 |
| Thermoplastic Polyester (PETG) | 1.27 | 73 |
| Polyester Elastomer | 1.20 | 69 |
| Nylon (transparent) | 1.14 | 77 |
| Nylon (type 66) | 1.14 | 65 |
| Nylon (type 6) | 1.14 | 78 |
| Nylon-(type 66–33% glass) | 1.34 | 69 |
| Cellulose Acetate | 1.29 | 62 |
| Cellulose Acetate Butyrate | 1.20 | 73 |
| Cellulose Acetate Propionate | 1.21 | 65 |
| Urethane Elastomer (polyester) | 1.20 | 81 |
| Urethane Elastomer (polyether) | 1.14 | 98 |
| Polyaryl-Ether | 1.14 | 82 |
| Polysulfone | 1.24 | 87 |
| Acetal Resin (homopolymer) | 1.41 | 82 |
| Acetal Resin (copolymer) | 1.41 | 77 |
| Ionomer | 0.945 | 81 |
| Polyphenylene Sulfide | 1.65 | 77 |
| Polyallomer | 0.899 | 89 |

The plastic materials are comminuted into a particle size suitable for froth flotation. The particle size can be one of the controlling factors in froth flotation. To produce flotation, the apparent density of the aggregated hydrophobic plastic material and gas bubbles attached thereto should be less than the density of the pulp, which is approximately 1 g/cc for water or larger if soluble salts are added. For large particles, the surface area to volume ratio is small. Therefore, the floatability of a polymer decreases with the increase of particle size. At particle sizes larger than about 0–5 inch, froth flotation separation of polymers is difficult unless the density of the polymer to be floated is only slightly higher than that of the pulp. In most cases, the particles preferable are less than about 0.25 inch and most preferable are within the range of about 4 mesh to about 28 mesh.

The effect of the particle size of the plastic material is illustrated in Table 2 below which summarizes results from floatability tests made with various size ABS and various dosages of $(C_2H_4O)_{40}C_{15}H_{24}O$.

TABLE 2

FLOATABILITY OF ABS AT VARIOUS PARTICLE SIZES DOSAGES OF $(C_2H_4O)_{40}C.H_{24}O$

| Dosages (g/l) | −16 Mesh | 10 × 16 Mesh | 8 × 10 Mesh | 6 × 10 Mesh |
|---|---|---|---|---|
| 0.00 | 100.00 | 100.00 | 100.00 | 100.00 |
| 0.02 | 99.90 | 100.00 | 100.00 | 100.00 |
| 0.04 | 99.81 | 100.00 | 100.00 | 100.00 |
| 0.08 | 99.50 | 99.90 | 100.00 | 83.43 |
| 0.16 | 88.72 | 80.30 | 52.76 | 18.45 |
| 0.40 | 21.09 | 15.90 | 10.50 | 6.78 |
| 0.80 | 12.77 | 10.34 | 3.88 | 0.69 |

9Particle size (mesh)

After comminution, the mixture of plastic materials is conditioned in a conventional flotation cell with an aqueous solution containing one or more heteropolar surfactants. The amount of plastic material added as feed is sufficient to form an aqueous pulp having a consistency suitable for an efficient froth flotation operation. Generally, the weight ratio of the plastic material to the aqueous solution is within the range of about 1:1 to about 1:1000, preferably about 1:3 to about 1:50.

Heteropolar surfactants used for conditioning the plastic materials contain a hydrophobic portion (nonpolar) and a hydrophilic portion (polar). The hydrophobic portion selectively adheres to the surfaces of the preselected plastic particles and the hydrophilic portion orients towards the water in the pulp. Heteropolar surfactants are classified according to the size and strength of the hydrophilic and hydrophobic portions which can be expressed by a so-called hydrophile-lipophile balance (HLB). Osipow, *Surface Chemistry*, p. 311 (1977). A surfactant having a low HLB value is more hydrophobic, while one having a high HLB value is more hydrophilic. To provide that the degree of hydrophilicity required to prevent the selected plastic material from floating, the heteropolar surfactant must have an HLB value greater than 5 and preferably greater than about 10.

A wide variety of heteropolar surfactants having HLB value greater than 5 can be used, including anionic, cationic, nonionic and amphoteric surfactants.

Suitable cationic surfactants include primary, secondary, tertiary and quaternary amines and diamines, and varieties thereof, such as acetate, hydrochloric, chloride and bromide salts, ether, ester and ethoxylated derivatives of such amines.

Suitable anionic surfactants include those containing anionic functional groups, such as carboxylic acid, sulfate, sulfonate, phosphate, thiophosphate, sulfon succinate, xanthate, taurate and salts and derivatives thereof, such as ethers, esters, and ethoxylates.

Suitable nonionic compounds include those containing functional groups such as alcohols, hydroxyls, esters, ethers, and derivatives thereof, such as ethoxylated compounds.

Suitable amphoteric surfactants include those containing both cationic and anionic functional groups, such as amino acids and salts, and derivatives thereof, such as ether, ester and ethoxylated compounds.

At present, the preferred heteropolar surfactants are those containing polyoxyethylene (polyethylene oxide) in their structures or so-called ethoxylated surfactants. Ethoxylation can be obtained on various cationic, anionic, and nonionic surfactants and oils to form ethoxylated surfactants. The number of ethylene oxide units in ethoxylated compounds permits a fine tuning for the HLB value. For example, a series of nonylphenoxy poly(oxyethylene) ethanol compounds having the formula $(C_2H_4O)_nC_{15}H_{24}O$ can be used in ethoxylated alcohol type nonionic surfactant. The HLB value can be adjusted by varying n as shown in Table 3 below:

creasing the concentration of the heteropolar surfactant $(C_2H_4O)_{40}C_{15}H_{24}O$ from 0 to about 0.5 g/l of water in the pulp decreases the contact angle of the phenoxy resin to 63°, but decreases the contact angle of ABS to only 83°. It also has been found that, when the same surfactant is used at a concentration of about 0.04 g/l, the floatability of phenoxy resin is reduced to about 1% while the floatability of ABS is about 99%.

Generally, the amount of heteropolar surfactant is about 0.0005 to about 50, preferably about 0.01 to about 2, grams per liter of water in the pulp. With amounts of heteropolar surfactant below about 0.0005 g/l water, the floatability or contact angle of the preselected plastic material being depressed is not reduced sufficiently to obtain a good separation, while amounts larger than about 50 g/l water do not significantly improve the separation.

The temperature for conditioning is not particularly critical and can range from about 0° to about 100° C. Generally, the floatability of the plastic materials increases with an increase in the conditioning temperature. For example, it has been found that the floatability of polyethylene terephthalate conditioned with $(C_2H_4O)_{40}C_{15}H_{24}O$ at a concentration of 0.08 g/l water increases from 4.59% at 22° C., to 28.33% at 40° C. and to 97.86% at 60° C. Thus, the conditioning temperature is an operating parameter which can be used to control the flotation separation. Generally, temperatures below 0° C. severely affects the efficiency of separation, while temperature above about 100° C. tend to make the process uneconomical. Except in situations where a higher temperature is required to obtain the desired separation, the conditioning temperature preferably is at an ambient temperature of about 5° to about 40° C.

The conditioned mixture of plastic materials or pulp is subjected to conventional froth flotation. A suitable gas, such as oxygen, nitrogen, hydrogen, methane or preferably air, is introduced into a conventional flotation cell which is operated in a manner to generate gas bubbles and create a turbulent condition for producing collisions between the gas bubbles and the plastic particles. The gas bubbles attach to the plastic particles having hydrophobic surfaces and cause them to float. While not necessary for some operations, a suitable frothing agent, such as alcohols containing 2–9 carbon atoms, methylisobutyl carbinol, glycols, such as polypropylene and methyl ethyl glycols and polyglycol ethers, pine oil and cresylic acid, may be added to the pulp before, during or after conditioning to promote dispersion and stabilization of the gas bubbles.

The flow rate of the gas into the flotation cell and the flotation time (time period for gas bubbling) will vary depending upon the type of plastics in the mixture, the amount of feed, the heteropolar surfactant, conditioning

TABLE 3

| RELATIONSHIP BETWEEN ETHOXYLATION AND HLB VALUE OF SURFACTANT | | | | | | | | | | | |
|---|---|---|---|---|---|---|---|---|---|---|---|
| n value | 4 | 5 | 6 | 7–8 | 9 | 10 | 15 | 20 | 30 | 40 | 50 | 100 |
| HLB value | 8.8 | 10.0 | 10.8 | 12.2 | 13.0 | 13.2 | 15.0 | 16.0 | 17.2 | 17.8 | 18.2 | 19.0 |

The amount of heteropolar surfactant depends primarily on the type and contact angle of the plastic materials to be separated and the surfactant used. For example, for separation of an acrylonitrile-butadiene-styrene from a phenoxy resin, both of which have a contact angle of 92° in pure water, it has been found that intemperature, type of flotation cell employed, etc. When air is used, the flow rate usually will be about 0.01 to about 1 cubic feet per gallon of pulp and the flotation or aeration time usually is about 1 to about 10 minutes.

During and/or subsequent to flotation, a float concentrate containing the hydrophobic plastic particles is separated by conventional means, such as scrapers or paddles. The plastic material selectively made hydrophilic by the heteropolar surfactant is collected in the cell product. The flotation can be carried out batchwise or in a continuous manner.

The flotation concentrate and/or cell product can be subjected to additional flotation stages, using this same or similar heteropolar surfactant at the same or different concentration, to improve the purity of the recovered plastic materials. Also, when the float concentrate and/or cell product contain two or more different types of plastic materials, they can subjected to additional flotation stages to effect further separation. For example, a mixture of acrylonitrile-butadiene-styrene, polycarbonate and polyvinyl chloride can be subjected to two flotation stages with a heteropolar surfactant at the same concentration, then two flotation stages with the surfactant at a higher concentration and the float concentrate from each stage being used as a feed to the next stage. Polyvinyl chloride is collected in the cell products from the first two stages, polycarbonate is collected in the cell products from the second two stages and acrylonitrile-butadiene-styrene is collected in the float concentrate from the last stage. As those skilled in the art can appreciate, a wide variety of different flotation schemes can be used to separate a larger number of different type plastic materials or improve the purity of one or more of the separated plastic materials.

The following examples are intended to exemplify embodiments of the invention and are not to be construed as limitations thereof.

EXAMPLE 1

A series of tests was conducted to determine the floatability of acrylonitrile-butadiene-styrene (ABS) and a phenoxy resin at various concentrations of a heteropolar surfactant, $(C_2H_4O)_{40}C_{15}H_{24}O$, which has a hydrophile-lipophile balance (HLB) value of 17.8. In each test, about 1 g of each resin at $-8$ mesh particle size was added to a Wemco laboratory flotation machine containing 300 ml water. Various amounts of $(C_2H_4O)_{40}C_{15}H_{24}O$ and a drop of 2% propylene glycol solution, a frothing agent, were also added. The flotation machine was equipped with a stirrer and an air inlet near the bottom of the flotation cell. After the stirrer was turned on, air bubbles were sucked into the cell to contact the plastic particles. Flotation was continued until all plastic particles were floated or for 5 minutes, whichever was less. All of the floated and unfloated materials were collected, filtered, dried, and weighed separately to determine how much of the resin floated at the different surfactant concentrations.

The results from these tests are summarized in Table 4 below.

TABLE 4

Floatability of Acrylonitrile-Butadiene-Styrene (ABS) and Phenoxy Resin

| Floatability | | $(C_2H_4O)_{40}C_{15}H_{24}O$ Concentration, g/l water | | | |
|---|---|---|---|---|---|
| | 0 | 0.02 | 0.04 | 0.08 | 0.16 |
| ABS Float Wt (%) | 100 | 98.82 | 99.08 | 97.97 | 98.70 |
| Cell Wt (%) | 0 | 1.18 | 0.92 | 2.03 | 1.30 |
| Phenoxy Float Wt (%) | 99.02 | 47.98 | 4.65 | 1.30 | 0.44 |
| Cell Wt (%) | 0.98 | 52.02 | 95.35 | 98.70 | 99.56 |

From these results, it can be seen that, without conditioning with a heteropolar surfactant, both plastic resins virtually completely floated (i.e., were hydrophobic), the floatability of the phenoxy resin decreased with increasing amounts of heteropolar surfactant and only 0.44% of the phenoxy resin floated at a surfactant concentration of 0.16 g/l water. On the other hand, the floatability of the ABS particles remained substantially unaffected at all surfactant concentration levels.

EXAMPLE 2

A mixture of 1.065 g of a black ABS and 1.233 g of a white phenoxy resin, both ground to particle size of $-8$ mesh, was subjected to froth flotation in the manner described in Example 1. The pulp contained 300 ml water and $(C_2H_4O)_{40}C_{15}H_{24}O$ at a concentration of 0.08 g/l. After 5 minutes of flotation, the float concentrate and the cell product weighed 1.057 g and 1.241 g, respectively. The amount of each resin in the two fractions was determined by hand picking the different colored particles. The float concentrate contained 1.051 g ABS and 0.014 g phenoxy resin. The cell product contained 0.006 g ABS and 1.227 g phenoxy resin. Thus, 98.67% of the ABS was recovered in the float concentrate at a purity of 98.11%, while 99.51% of the phenoxy resin was recovered in the cell product at a purity of 98.87%. This demonstrates that, in accordance with the invention, use of a heteropolar surfactant having a HLB value greater than 5 is effective for selectively making one hydrophobic plastic material (phenoxy resin) hydrophilic without adversely affecting the hydrophobicity of another (ABS).

EXAMPLE 3

A mixture of 1.011 g of a black polyvinyl chloride (PVC) and 1.119 g of a white phenoxy resin, both ground to a particle size of $-8$ mesh, was subjected to froth flotation and the float concentrate and cell product analyzed in the manner described in Example 2, except that the concentration of $(C_2H_4O)_{40}C_{15}H_{24}O$ was 0.04 g/l water.

The float concentrate and the cell product weighed 0,944 g and 1.186 g, respectively. The float concentrate contained 0,915 g PVC and 0,029 g phenoxy resin. The cell product contained 0,096 g PVC and 1,090 g phenoxy resin. Thus, 90.50% of the PVC was recovered in the float concentrate at a purity of 96.93%, while the 97.41% of the phenoxy resin was recovered in the cell product at a purity of 91.91%, This further demonstrates the effectiveness of a heteropolar surfactant to selectively make a hydrophobic plastic (phenoxy resin) hydrophilic without adversely affecting the hydrophobicity of another (PVC).

EXAMPLE 4

A mixture of 0.953 g of a black ABS and 1.146 g of a gray PVC, both ground to a particle size of $-8$ mesh, was subjected to froth flotation and the float concentrate and the cell product analyzed in the manner described in Example 2, except that a mixture of $(C_2H_4O)_{20}C_{15}H_{24}O$ at a concentration of 0.040 g/l water and $(C_2H_4O)_{40}C_{15}H_{24}O$ at a concentration of 0.080 g/l water was used as the heteropolar surfactant.

The float concentrate and the cell product weighed 0.938 g and 1.161 g, respectively. The float concentrate contained 0.855 g ABS and 0.083 g PVC. The cell product contained 0.098 g ABS and 1.063 g PVC. Thus, 89.72% of the ABS was recovered in the float concentrate at a purity of 91.15%, while 92.76% of the PVC was recovered in the cell product at a purity of 91.56%. This demonstrates that, by using an appropriate heteropolar surfactant and concentrations thereof a plastic material (PVC) which remains hydrophobic is one separation like Example 3 can selectively be made hydrophilic for another separation.

EXAMPLE 5

A mixture of 0.986 g of a black ABS and 0.995 g of a transparent polycarbonate, both ground to a particle size of −8 mesh, was subjected to froth flotation in the manner described in Example 2 using $(C_2H_4O)_{40}C_{15}H_{24}O$ at a concentration of 0.15 g/l water. The flotation process was repeated five times. Each time, the float concentrate from the previous flotation was placed in an aqueous solution of the same surfactant concentration as the feed for the next flotation. The float concentrate after the fifth flotation weighed 1.012 g and contained 0.899 g ABS. The combined cell products of the five flotations weighed 0.969 g and contained 0.882 g polycarbonate. Thus, 91.61% of the ABS was recovered in the float concentrate at a purity of 88.83%, while 88.63% of the polycarbonate was recovered in the cell product at a purity of 91.02%.

EXAMPLE 6

A mixture of 1 g of a black ABS, 1 g of a transparent polycarbonate and 1 g of a gray PVC, all ground to a particle size of −8 mesh, was subjected to different flotation schemes. As shown in Examples 4 and 5, the floatability of the three resins are ABS>polycarbonate>PVC.

In one scheme, the mixture was subjected to flotation two times with $(C_2H_4O)_{40}C_{15}H_{24}O$ at a concentration of 0.04 g/l water and then to flotation two times with the same heteropolar surfactant at concentration of 0.15 g/l water. The float concentrate from each flotation was used as the feed for the next flotation. The cell products from the first two flotations (surfactant concentration=0.04 g/l) were collected as the PVC concentrate. The cell products from the last two flotations (surfactant concentration=0.15 g/l) were collected as the polycarbonate. The float fraction from the last flotation was the ABS concentrate.

The ABS concentrate contained 98.31 weight % ABS, 1.58 weight % polycarbonate and 0.11 weight % PVC and recovery of ABS from the feed was 93.45%. The PVC concentrate contained 85.27 weight % PVC, 14.7 weight % polycarbonate and 0.56 weight % ABS. The polycarbonate concentrate contained 85.15% polycarbonate, 9.28 weight % PVC and 5.57 weight % ABS.

In another scheme, the same surfactant and concentrations were used, but the overall flotation scheme was modified to include only one flotation at a surfactant concentration of 0.04 g/l water and two at a surfactant concentration of 0.15 g/l water. The purity of PVC in the PVC concentrate was improved from 85.27% to 95.14% and the polycarbonate and ABS impurities reduced to 3.93% and 0.93%, respectively. The ABS concentrate contained 89.5 weight % ABS, 10.29 weight % polycarbonate and 0.19 weight % PVC.

From these results, it can be seen that various flotation schemes can be employed to control the separation of various plastic materials and that separation of three or more plastic materials can be achieved with multiple stage flotations.

EXAMPLE 7

Tests like those described in Example 1 were conducted to determine the floatability of ABS and PVC at various concentrations of an anionic surfactant, dioctyl sulfonsuccinate (sodium salt), which has a HLB greater than 5.

The results from these tests are summarized in Table 5 below.

TABLE 5
FLOATABILITY OF ABS AND PVC AT VARIOUS SODIUM DIOCTYL SULFONSUCCINATE CONCENTRATIONS

| Floatability | Sodium Dioctyl Sulfonsuccinate Concentration, g/l water | | | | | |
|---|---|---|---|---|---|---|
| | 0.02 | 0.04 | 0.08 | 0.16 | 0.40 | 0.80 |
| ABS Float Wt (%) | 98.82 | 98.62 | 98.81 | 99.11 | 94.78 | 95.41 |
| PVC Float Wt (%) | 95.40 | 89.98 | 77.14 | 38.04 | 9.86 | 2.71 |

EXAMPLE 8

Tests were performed to compare the separability of two plastic materials using a heteropolar surfactant in accordance with the invention and a primary fatty amine surfactant as disclosed in Valdez et al U.S. Pat. No. 4,167,477. A black ABS and a gray PVC having a particle size of −3/32 inch were tested for froth floatability. In each test, 1 g of each plastic material was placed in a 250 ml aqueous solution containing a predetermined amount of either $(C_2H_4O)_{40}C_{15}H_{24}O$ or Aeromine, a $C_{17}$ primary amine acetate marketed by American Cyanamide Co. and having a HLB value of less than 5. Froth flotation was conducted as described in Example 1 and the float concentrates and cell products analyzed as described in Example 2. The results from these tests are summarized in Tables 6 and 7 below.

TABLE 6
(Invention)
Floatability of Acrylonitrile-Butadiene-Styrene (ABS) and Polyvinyl Chloride (PVC)

| Floatability | $(C_2H_4O)_{40}C_{15}H_{24}O$ Concentration, g/l water | | | | |
|---|---|---|---|---|---|
| | 0 | 0.02 | 0.04 | 0.08 | 0.16 |
| ABS Float Wt (%) | 100 | 98.82 | 99.08 | 97.97 | 98.70 |
| PVC Float Wt | 97.68 | 13.46 | 9.20 | 7.18 | 2.36 |

TABLE 7
(U.S. Valdez et al. Patent 4,167,477)
Floatabilities of ABS and PVC at Various Aeromine 3037 Concentrations

| Floatability | Aeromine 3037 Concentration, g/l water | | | | | | |
|---|---|---|---|---|---|---|---|
| | 0 | 0.02 | 0.04 | 0.08 | 0.16 | 0.40 | 0.80 |
| ABS Float Wt % | 100.00 | 100.00 | 99.60 | 99.41 | 99.60 | 99.30 | 99.90 |
| PVC Float Wt % | 97.68 | 82.97 | 90.28 | 97.73 | 98.08 | 98.89 | 88.76 |

Referring to Table 6, it can be seen that, at a $(C_2H_4O)_{40}C_{15}H_{24}O$ concentration of 0.16 g/l water, the floatability of ABS was 98.78 weight %, while only 2.36 weight % of the PVC floated. Therefore, ABS can be separated from PVC by froth flotation employing a heteropolar surfactant having a HLB value greater than 5.

On the other hand, referring to Table 7, the floatability of both ABS and PVC remained very high with a primary fatty amine salt at concentrations up to five times the maximum used for a heteropolar surfactant, (i.e., 0.80 vs. 0.16). Consequently, ABS cannot be separated from PVC by froth flotation employing such a surfactant.

EXAMPLE 9

Tests were performed to compare the separability of ABS and PVC using a heteropolar surfactant in accordance with the invention and sodium lignin sulfonate as disclosed in U.S. Pat. Nos. 3,925,200, 3,926,790, 3,926,791, 3,985,650 and 4,132,633. The test procedure was the same as in Example 8, except that different concentrations of sodium lignin sulfonate were used in place of the primary fatty amine salt. The results from these tests are summarized in Table 8 below.

TABLE 8

(U.S. Izumi et al. Patent 3,925,200 et al.)
Floatabilities of ABS and PVC at Various
Sodium Lignin Sulfonate Concentrations

| Floatability | Sodium-Lignin Sulfonate Concentration, g/l water | | | | |
|---|---|---|---|---|---|
| | 0 | 0.02 | 0.04 | 0.08 | 0.16 |
| ABS Float Wt (%) | 100.00 | 99.51 | 99.61 | 99.61 | 99.61 |
| PVC Float Wt (%) | 97.68 | 98.90 | 95.41 | 81.38 | 55.87 |

It can be seen that, at a sodium lignin sulfonate concentration of 0.16 g/l water, the floatability of ABS and PVC were 99.61% and 55.85%, respectively. Referring to Table 6, it can be seen that floatability of ABS and PVC with a heteropolar surfactant at the same concentration was 98.70% and 2.36%, respectively. Thus, a substantially superior separation can be obtained by using a heteropolar surfactant to selectively make a normally hydrophobic plastic material hydrophilic in accordance with the invention.

EXAMPLE 10

Tests were performed to compare the separability of ABS and polyethylene terephthalate (PET), using a heteropolar surfactant in accordance with the invention and a hydrophilic organic colloid (tannic acid) as disclosed the patents identified in Example 8. The test procedure was the same as in Example 7, except that different concentrations of tannic acid were used in place of the primary fatty amine salt. The results from these tests are summarized in Tables 9 and 10 below.

TABLE 9

(U.S. Izumi et al. Patent 3,925,200 et al.)
Floatabilities of ABS and PET at Various
Tannic Acid Concentrations

| Float-ability | Tannic Acid Concentrations, g/l water | | | | | | |
|---|---|---|---|---|---|---|---|
| | 0 | 0.02 | 0.04 | 0.08 | 0.16 | 0.40 | 0.80 |
| ABS Float Wt % | 100.00 | 97.50 | 96.45 | 95.01 | 76.19 | 33.69 | 24.56 |
| PET Float Wt % | 99.75 | 38.61 | 36.58 | 24.05 | 16.16 | 6.49 | 3.94 |

TABLE 10

(Invention)
Floatabilities of ABS and PET at Various
$(C_2H_4O)_{40}C_{15}H_{24}O$ Concentrations

| Floatability | $(C_2H_4O)_{40}C_{15}H_{24}O$ Concentration, g/l water | | | |
|---|---|---|---|---|
| | 0 | 0.02 | 0.04 | 0.08 |
| ABS Float Wt % | 100.00 | 98.82 | 99.08 | 97.97 |
| PET Float Wt % | 99.75 | 100.00 | 79.93 | 4.59 |

Referring to Table 9, it can be seen that an increase in tannic acid concentration caused a decrease in the floatability (depression) of both ABS and PET with PET being depressed to a higher extent than ABS. It appears that the best separation may occur at about 0.08 g tannic acid g/l of water where the floatability of ABS and PET was 95.01% and 24.05%, respectively. Referring to Table 10, it can be seen that, at that same concentration of the heteropolar surfactant $(C_2H_4O)_{40}C_{15}H_{24}O$, the floatability of ABS and PET was 97.97% and 4.59%, respectively.

This further demonstrates that a substantially superior separation of plastic materials having normally hydrophobic surfaces can be obtained by using a heteropolar surfactant in accordance with the invention.

From the foregoing description, one skilled in the art can easily ascertain the essential characteristics of the invention and, without departing from the spirit and scope thereof, make various changes and modifications to adapt it to various uses.

I claim:

1. A process for separating by froth flotation a targeted particulate synthetic, organic plastic material having normally hydrophobic surface characteristics from a mixture of said targeted plastic material and at least one other different type of such particulate plastic material, said process comprising the steps of:

(a) conditioning said mixture in an aqueous medium consisting essentially of a heteropolar surfactant having a hydrophile-lipophile balance (HLB) value greater than 5 and water to produce a conditioned pulp, the amount of said heteropolar surfactant being sufficient to depress said targeted plastic material by making the surfaces thereof hydrophilic without substantially affecting the hydrophobicity of the surfaces of said at least one other type plastic material;

(b) introducing gas bubbles into the conditioned pulp while in a flotation cell, whereby the gas bubbles selectively adhere to the surfaces of said at least one, other different type plastic material and cause said at least one other different type plastic material to float;

(c) recovering a cell product containing said targeted plastic material; and (d) recovering a float fraction containing said at least one ether different type plastic material.

2. A process according to claim 1 wherein the targeted plastic materials in said mixture have a contact angle of at least 30°, measured at a temperature of 20° C.

3. A process according to claim 2 wherein the targeted plastic materials in said mixture have a contact angle of at least 50°, measured at a temperature of 20° C.

4. A process according to claim 1 wherein the plastic materials in said mixture have a particle size less than about 0.5 inch.

5. A process according to claim 4 wherein the plastic materials in said mixture have a particle size less than about 0.25 inch.

6. A process according to claim 1 wherein said surfactant is cationic, anionic, nonionic or amphoteric.

7. A process according to claim 6 wherein the HLB value of said surfactant is at least 10.

8. A process according to claim 6 wherein said surfactant is an ethoxylated surfactant containing polyoxyethylene in its structure.

9. A process according to claim 6 wherein the amount of said surfactant is within the range of about 0.0005 to about 50 grams per liter of water in said aqueous medium.

10. A process according to claim 6 wherein the amount of said surfactant is within the range of about 0.01 to about 2 grams per liter of water in said aqueous medium.

11. A process according to claim 6 wherein the plastic materials in said mixture are selected from the group consisting of polyolefins, polyesters, polyamides, celluloses, polyurethanes, polyethers, poly sulfides, phenolic resins, fluorocarbon polyphers and mixtures thereof.

12. A process for separating by froth flotation first and second targeted particulate synthetic, organic plastic materials having normally hydrophobic surface characteristics from a mixture of said first and second targeted plastic materials and at least one other different type of such particulate plastic material, said process comprising the steps of:
   (a) conditioning said mixture of plastic materials in an aqueous medium consisting essentially of a heteropolar surfactant having a hydrophile-lipophile balance (HLB) value greater than 5 and water to produce a conditioned pulp, the amount of said heteropolar surfactant being sufficient to depress said first targeted plastic material by making the surfaces thereof hydrophilic without substantially affecting the hydrophobicity of the surfaces of said second targeted plastic material and said at least one other different type plastic material;
   (b) introducing gas bubbles into the conditioned pulp while in a flotation cell, whereby the gas bubbles selectively adhere to the surfaces of said second targeted plastic material and said at least one other different type plastic material and cause said second targeted and said at least one other different type plastic material to float;
   (c) recovering a first cell product containing said first targeted plastic material;
   (d) recovering a first float fraction containing said second targeted and said at least one other different type plastic materials;
   (e) conditioning said first float fraction with a sufficient amount of said surfactant to depress said second targeted plastic material by making the surfaces thereof hydrophilic without substantially affecting the hydrophobicity of the surfaces of said at least one other different type plastic material;
   (f) introducing gas bubbles in the conditioned first float fraction while in a flotation cell, whereby the gas bubbles selectively adhere to the surface of said at least one other different type plastic material and cause said at least one other different type plastic material to float;
   (g) recovering a second cell product containing said second targeted plastic material; and
   (h) recovering a second float fraction containing said at least one other different type plastic material.

13. A process for separating by froth flotation a targeted particulate synthetic, organic plastic material having normally hydrophobic surface characteristics and a contact angle of at least 30°, measured at 20° C., from a mixture containing said targeted plastic material and at least two other different types of such particulate plastic material, said process comprising the steps of:
   (a) comminuting the plastic materials in said mixture to a particle size less than about 0.5 inch;
   (b) conditioning said mixture of plastic materials in an aqueous medium consisting essentially of a heteropolar, cationic, anionic, nonionic or amphoteric surfactant having a hydrophile-lipophile balance (HLB) value greater than 5 and water to produce a conditioned pulp, the amount of said surfactant being sufficient to depress said targeted plastic material by making the surfaces thereof hydrophilic without substantially affecting the hydrophobicity of the surfaces of said at least two other different type plastic materials;
   (c) introducing gas bubbles into the conditioned pulp while in a flotation cell, whereby the gas bubbles selectively adhere to the surfaces of said at least two other plastic materials and cause said at least two other different type plastic materials to float;
   (d) recovering a cell product containing said targeted plastic material; and
   (e) recovering a float fraction containing said at least two other different type plastic materials.

14. A process according to claim 13 wherein the HLB value of said surfactant is at least 10.

15. A process according to claim 14 wherein said surfactant is an ethoxylated surfactant containing polyoxyethylene in its structure.

16. A process according to claim 15 wherein the plastic materials in said mixture have a particle size less than about 0.25 inch.

17. A process according to claim 15 wherein the amount of said surfactant is within the range of about 0.0005 to about 50 grams per liter of water in said aquous medium.

18. A process according to claim 17 wherein the amount of said surfactant is within the range of about 0.01 to about 2 grams per liter of water in said aquous medium.

19. A process for separating by froth flotation first and second targeted particulate synthetic, organic plastic materials having normally hydrophobic surface characteristics and a contact angle of at least 30° measured at 20° C. from a mixture containing said first and second targeted plastic materials and at least one other different type of such particulate plastic material, said process comprising the steps of:
   (a) comminuting the plastic materials in said mixture to a particle size less than about 0.5 inch;
   (b) conditioning said mixture of plastic materials in an aqueous medium consisting essentially of a heteropolar, cationic, anionic, nonionic or amphoteric surfactant having a hydrophile-lipophile balance (HLB) value greater than 5 and water to produce a conditioned pulp, the amount of said surfactant being sufficient to depress said first targeted plastic material by making the surfaces thereof hydrophilic without substantially affecting the hydrophobicity of the surfaces of said second targeted material plastic material or said at least one other different type plastic material;

(c) introducing gas bubbles into the conditioned pulp while in a flotation cell, whereby the gas bubbles selectively adhere to the surfaces of said second targeted plastic material and said at least one other different type plastic material and cause said second targeted and said at least one other different type plastic material to float;

(d) recovering a first cell product containing said first targeted plastic material; and (e) recovering a first float fraction containing said second targeted and said at least one other different type plastic material;

(f) conditioning said first float fraction with a sufficient amount of a said surfactant to depress said second targeted plastic material by making the surface thereof hydrophilic without substantially affecting the hydrophobicity of the surfaces of said at least one other different type plastic material;

(g) introducing gas bubbles into the conditioned first float fraction while in a flotation cell, whereby the gas bubbles selectively adhere to the surfaces of said at least one other different type plastic material and cause said at least one other different type plastic material to float;

(h) recovering a second cell product containing said second targeted plastic material in the cell product; and (i) recovering a second float fraction containing said at least one other different type plastic material.

20. A process according to claim 19 wherein the HLB value of said surfactant is at least 10.

21. A process according to claim 20 wherein said surfactant is an ethoxylated surfactant containing polyoxyethylene in its structure.

22. A process according to claim 21 wherein the plastic materials in said mixture are selected from the group consisting of polyolefins, polyesters, polyamides, celluloses, polyurethanes, polyethers, polysulfides, phenolic resins, fluorocarbon polymers and mixtures thereof.

23. A process according to claim 22 wherein the plastic materials in said mixture have a particle size less than about 0.25 inch.

24. A process according to claim 22 wherein the amount of said surfactant is within the range of about 0.0005 to about 50 grams per liter of water in said aquous medium.

25. A process according to claim 24 wherein the amount of said surfactant is within the range of about 0.01 to about 2 grams per liter of water in said aquous medium.

* * * * *

UNITED STATES PATENT AND TRADEMARK OFFICE
CERTIFICATE OF CORRECTION

PATENT NO. : 5,377,844
DATED : January 3, 1995
INVENTOR(S) : Jiann-Yang Hwang

It is certified that error appears in the above-identified patent and that said Letters Patent is hereby corrected as shown below:

Column 12, line 53, after "one", delete ",";

Column 12, line 58, delete "ether", and insert ---other---.

Signed and Sealed this

Twenty-fifth Day of April, 1995

Attest:

BRUCE LEHMAN

*Attesting Officer*  *Commissioner of Patents and Trademarks*